United States Patent
Huras et al.

(10) Patent No.: US 9,223,820 B2
(45) Date of Patent: *Dec. 29, 2015

(54) PARTITIONING DATA FOR PARALLEL PROCESSING

(71) Applicant: International Business Machines Corporation, Armonk, NY (US)

(72) Inventors: Matthew A. Huras, Ajax (CA); Sam S. Lightstone, Toronto (CA); Haider A. Rizvi, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,841

(22) Filed: Sep. 11, 2014

(65) Prior Publication Data

US 2015/0032780 A1    Jan. 29, 2015

Related U.S. Application Data

(63) Continuation of application No. 13/836,916, filed on Mar. 15, 2013.

(51) Int. Cl.
*G06F 17/30* (2006.01)

(52) U.S. Cl.
CPC .... *G06F 17/30339* (2013.01); *G06F 17/30584* (2013.01)

(58) Field of Classification Search
CPC ...................... G06F 17/30339; G06F 17/30584
See application file for complete search history.

(56) References Cited

U.S. PATENT DOCUMENTS

| | | | |
|---|---|---|---|
| 6,665,684 B2 | 12/2003 | Zait et al. | |
| 7,080,081 B2 | 7/2006 | Agarwal et al. | |
| 7,512,625 B2 | 3/2009 | Lariba-Pey et al. | |
| 7,680,761 B2 | 3/2010 | Zait et al. | |
| 2004/0199533 A1 | 10/2004 | Celis et al. | |
| 2010/0030995 A1 | 2/2010 | Wang et al. | |
| 2010/0235606 A1 | 9/2010 | Oreland et al. | |
| 2012/0317093 A1* | 12/2012 | Teletia et al. | 707/714 |

OTHER PUBLICATIONS

Sriram Padmanabhan, Bishwaranjan Bhattacharjee, Timothy Malkemus, Leslie Cranston, Matthew Huras: Multi-Dimensional Clustering: A New Data Layout Scheme in DB2. 2003 SIGMOD Conference, San Diego, CA. pp. 637-641.

(Continued)

*Primary Examiner* — Huawen Peng
(74) *Attorney, Agent, or Firm* — Mohammed Kashef; Edell, Shapiro & Finnan, LLC

(57) ABSTRACT

According to one embodiment of the present invention, a system partitions data for parallel processing and comprises one or more computer systems with at least one processor. The system partitions data of a data object into a plurality of data partitions within a data structure based on a plurality of keys. The data structure includes a plurality of dimensions and each key is associated with a corresponding different dimension of the data structure. Portions of the data structure representing different data partitions are assigned to the computer systems for parallel processing, and the assigned data structure portions are processed in parallel to perform an operation. Embodiments of the present invention further include a method and computer program product for partitioning data for parallel processing in substantially the same manner described above.

5 Claims, 6 Drawing Sheets

LINEITEM TABLE

ORDERS TABLE (56) References Cited

OTHER PUBLICATIONS

Bishwaranjan Bhattacharjee, Sriram Padmanabhan, Timothy Malkemus, Tony Lai, Leslie Cranston, Matthew Huras: Efficient Query Processing for Multi-Dimensionally Clustered Tables in DB2. V963-974. 2003 VLDB, Berlin, Germany. 12 pages.

Theo Hardier: Multi-Dimensional Access Paths. http://wwwlgis.informatik.uni-kl.de/cms/fileadmin/courses/SS2011/RDBS/lectures/Chapter_09.Multi_dim_AP.pdf.pdf (esp. slides labeled 9-16 to 9-18). AGDBIS 2011. 22 pages.

Herodotos Herodotou, Nedyalko Borisov, Shivnath Babu: Query Optimization Techniques for Partitioned Tables. SIGMOD '11, Jun. 12-16, 2011, ACM 978-1-4503-0661-4/11/06, Athens, Greece. 12 pages.

Multi Dimensional Clustering (MDC). http://www.research.ibm.com/mdc/. Accessed Apr. 20, 2012. 3 pages.

Keith L. Kelley and Marek Rusinkiewicz. Multikey, Extensible Hashing for Relational Databases. Jul. 1988. 0740-7459/88/0700/0077. IEEE pp. 77-85.

* cited by examiner

PARTITIONING DATA FOR PARALLEL PROCESSING

CROSS-REFERENCE TO RELATED APPLICATIONS

This application is a continuation of U.S. patent application Ser. No. 13/836,916, entitled "PARTITIONING DATA FOR PARALLEL PROCESSING" and filed Mar. 15, 2013, the disclosure of which is incorporated herein by reference in its entirety.

BACKGROUND

1. Technical Field

Present invention embodiments relate to partitioning data, and more specifically, to partitioning data within a shared data storage unit for parallel processing of database or other operations.

2. Discussion of the Related Art

Large scale analytics often require the processing power of multiple servers to compute results of complex queries in a reasonable amount of processing time. Several scale out architectures have been defined for this task, including massively parallel processor architectures. The massively parallel processor architectures are popular, and divide the processing of data across central processing units (CPUs) using various techniques, such as hash distribution or round robin. However, a major limitation in these approaches occurs in most real environments where data to be joined is not collocated on the same server in a server cluster, thereby requiring transfer of data among the servers. The resulting network traffic incurred (to collocate the required data for a join operation on the same CPU for processing) is prohibitive.

Some systems collocate join tables through a common hashing algorithm. However, this approach is limited to collocating data along a single dimension (where the data is not collocated along other dimensions). Accordingly, join operations along these non-collocated dimensions require use of broadcast or directed joins. These joins direct each server to send to every other server all rows from a hash partition by that server of one or more tables being joined, thereby being far less efficient.

BRIEF SUMMARY

According to one embodiment of the present invention, a system partitions data for parallel processing and comprises one or more computer systems with at least one processor. The system partitions data of a data object into a plurality of data partitions within a data structure based on a plurality of keys. The data structure includes a plurality of dimensions and each key is associated with a corresponding different dimension of the data structure. Portions of the data structure representing different data partitions are assigned to the computer systems for parallel processing, and the assigned data structure portions are processed in parallel to perform an operation. Embodiments of the present invention further include a method and computer program product for partitioning data for parallel processing in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments partition table data for parallel processing, and include: smart data placement in storage by hashing along plural table columns; using the hashing to access data for one or more tables in parallel across a cluster of server systems; and performing an operation (e.g., join of related tables, etc.) via parallel processing without transfer of table data or communications between database nodes. Thus, present invention embodiments may eliminate communication mechanisms that are generally utilized for passing table data to or between partitions in order to collocate the table data (e.g., transfer of data to a specific server in a cluster, transfer of data to several (or all other) servers in the cluster, where the servers can be virtual servers within the same or different physical machines), thereby significantly reducing traffic.

In addition, present invention embodiments enable data for various join operations to be collocated and facilitate parallel processing of those join operations. Tradeoffs with respect to performance of the join operations are reduced, thereby simplifying design.

Present invention embodiments hash data of a database table to cells of a multidimensional data structure in order to partition the data for parallel processing of a database or other operation by a plurality of processing entities (e.g., plural agents within a server system, plural server systems, etc.). A cell typically refers to a logical concept, where each unique combination of clustering keys forms a cell definition. Data for each cell is stored in zero or more storage blocks. If there are no records for a cell, then the cell requires no storage blocks. The data within the same table is effectively hashed in plural manners (e.g., based on a plurality of keys or key columns) to form the partitions. The hashed database tables (or multidimensional structures) are preferably stored on a shared disk infrastructure which is common and used in many enterprises for its ease of use and availability characteristics. Thus, each processing entity may concurrently access and process different partitions of the data within the shared data storage unit (e.g., without conflicts or transferring the table data among the processing entities) to process a database or other operation in parallel.

Although shared disk technology is arguably limited for use in analytic query processing because disk arm movement incurred by parallel central processing unit (CPU) requests to the same disks reduces input/output (I/O) efficiency, the benefits of collocating data outweighs the detriments of additional arm movement in many cases. Further, the advent of solid-state drive (SSD) and other emerging disk technologies that do not depend on physical disk movement enables the latency for seek time on concurrent requests to become more constant, thereby minimizing the detriment of concurrent requests from multiple CPUs across many disks (relative to each CPU driving a higher volume of requests on dedicated disks). Similarly, the advent of large system memories is reducing the amount and frequency of I/O that database systems need to perform.

Figure 1:
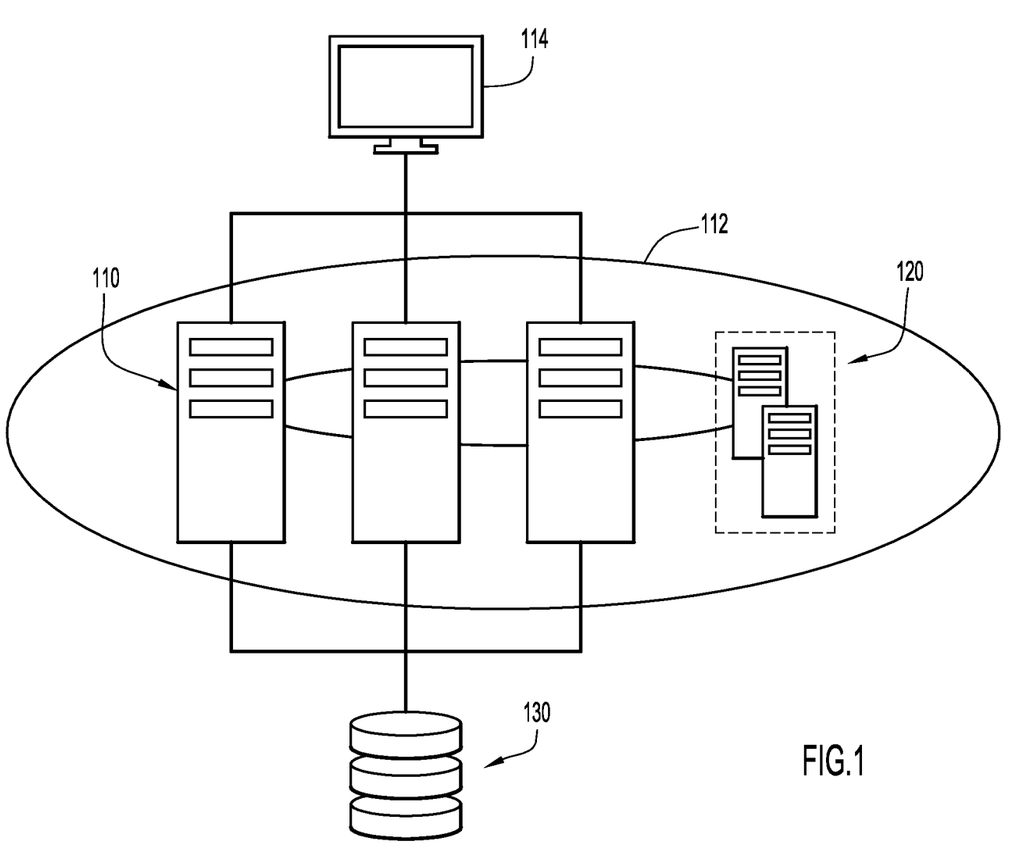
FIG. 1 is a diagrammatic illustration of an example computing environment of an embodiment of the present invention.

An example computing environment for a partitioning system of a present invention embodiment is illustrated in FIG. 1. Specifically, the computing environment includes a plurality of server systems 110, one or more client or end-user systems 114, and one or more memory control server systems 120. Server systems 110, 120 and client systems 114 may be remote from each other and communicate over a network 112. The network may be implemented by any number of any suitable communications media (e.g., wide area network (WAN), local area network (LAN), Internet, Intranet, etc.). Alternatively, server systems 110, 120 and client systems 114 may be local to each other, and communicate via any appropriate local communication medium (e.g., local area network (LAN), hardwire, wireless link, Intranet, etc.).

Client systems 114 enable users to interact with server systems 110 to provide database queries or other operations. The client systems may present one or more graphical user (e.g., GUI, etc.) or other interfaces (e.g., command line prompts, menu screens, etc.) to solicit information from users (e.g., queries, etc.), and may provide various reports (e.g., query information, query results, etc.).

A shared data storage unit 130 may store various information (e.g., hash partitioned tables, multidimensional structures, etc.), and is accessible by each of server systems 110 in parallel. The server systems may form a cluster or network of server systems (e.g., a remote direct memory access (RDMA) network (e.g., employing InfiniBand switches, RDMA over converged Ethernet (RoCE), etc.) with IBM DB2 Cluster services, ORACLE RAC (or other shared-disk database), TCP/IP or other standard or proprietary networking protocol, etc.) to access shared data storage unit 130. The shared data storage unit may be implemented by any conventional or other database or storage unit, may be local to or remote from server systems 110, 120 and client systems 114, and may communicate via any appropriate communication medium (e.g., local area network (LAN), wide area network (WAN), Internet, hardwire, wireless link, Intranet, etc.). Memory control server systems 120 control access to shared data storage unit 130 by server systems 110. Since server systems 110 each have concurrent access to the shared data storage unit, memory control server systems 120 maintain integrity of the data (e.g., prevent reading of data by one server system while another server system is overwriting that same data) and handle potential access collisions (e.g., two or more server systems accessing the same data).

Memory control server systems 120 and client systems 114 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, memory access control software, browser/interface software, etc.).

Figure 2:
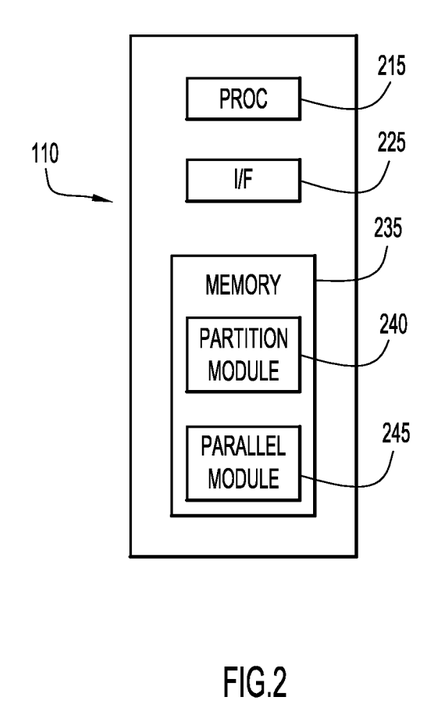
FIG. 2 is a block diagram of a server system of the computing environment of FIG. 1 according to an embodiment of the present invention.

An example server system 110 is illustrated in FIG. 2. Specifically, server system 110 may be implemented by any conventional or other computer system. The computer system is preferably equipped with a display or monitor, a base, optional input devices (e.g., a keyboard, mouse or other input device), and any commercially available and custom software (e.g., server/communications software, etc.). The base includes at least one processor 215, one or more memories 235 and/or internal or external network interfaces or communications devices 225 (e.g., modem, network cards, etc.). Moreover, the server system may employ one or more agents or processes to provide parallel processing of tasks (e.g., agents or processes 610, 620, 630, 640 as described below for FIG. 6).

The server system further includes a partition module 240 to hash partition database tables, and a parallel module 245 to assign tasks or jobs to server systems 110 for parallel processing of database (e.g., join, etc.) or other operations. Partition module 240 and parallel module 245 may include one or more modules or units to perform the various functions of present invention embodiments described below (e.g., hash partition tables, distribute tasks or jobs among plural server systems and/or agents, etc.). The various modules (e.g., partition module, parallel module, etc.) may be implemented by any combination of any number of software and/or hardware modules or units, and may reside within memory 235 of one or more server systems 110 for execution by corresponding processors 215.

Figure 3:
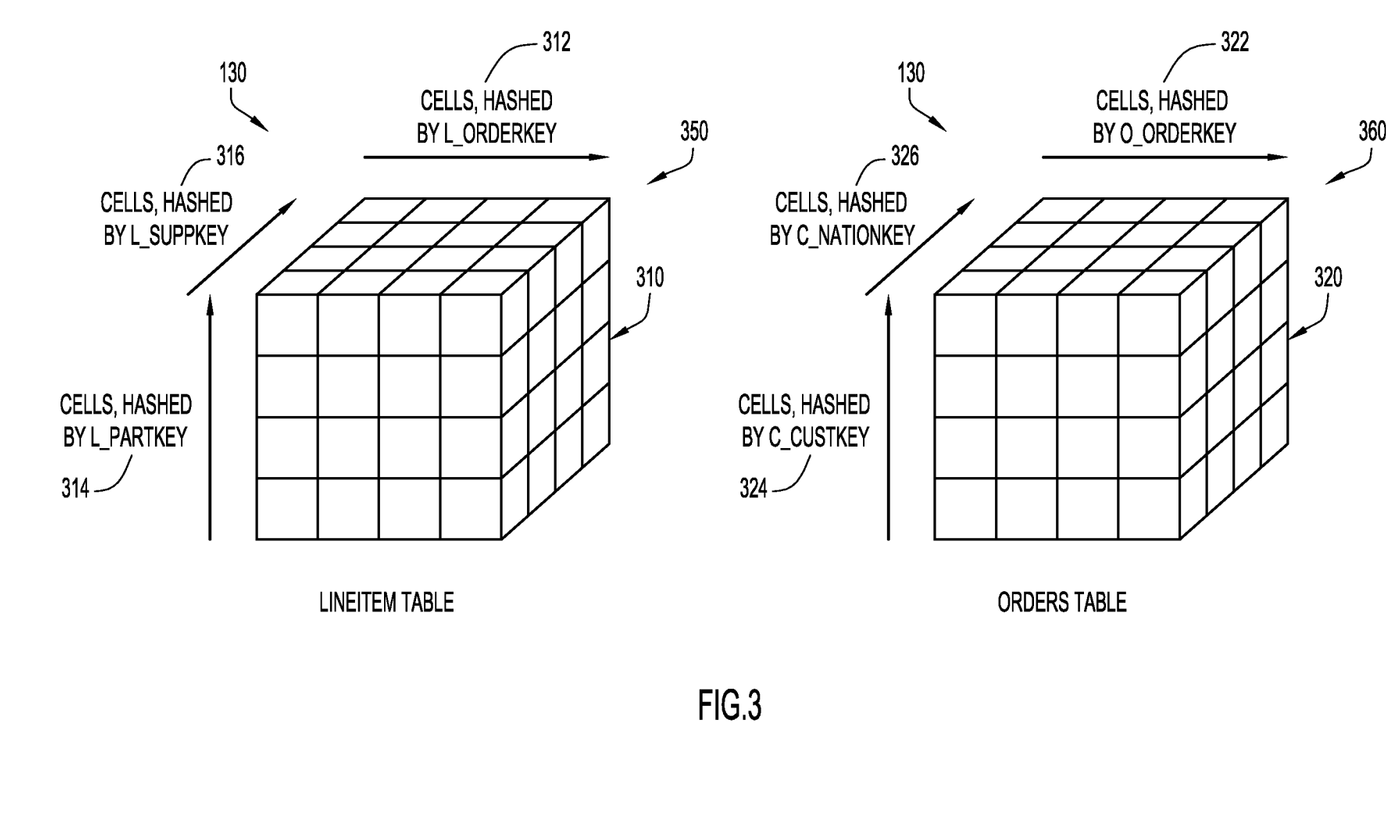
FIG. 3 is a diagrammatic illustration of partitioned database tables within a shared data storage unit according to an embodiment of the present invention.

Present invention embodiments partition data substantially evenly across processing entities (e.g., server systems, agents, etc.), thereby maintaining data collocated within a shared data storage unit for efficient parallel processing. Referring to FIG. 3, and by way of example, queries may join a table 310 (e.g., LINEITEM with keys L_ORDERKEY 312, L_PARTKEY 314, and L_SUPPKEY 316 as viewed in FIG. 3) to a table 320 (e.g., ORDERS with keys O_ORDERKEY 322, C_CUSTKEY 324, and C_NATIONKEY 326 as viewed in FIG. 3) via key 312 (e.g., L_ORDERKEY) by matching to key 322 (e.g., O_ORDERKEY).

Currently, conventional techniques may hash partition table 310 (e.g., LINEITEM) along a single dimension, but cannot hash partition the table along multiple dimensions. For example, when table 310 is hash partitioned based on a composite or multiple keys (e.g., L_ORDERKEY, L_PARTKEY), conventional techniques provide no ability to hash using only L_PARTKEY 314 (or L_ORDERKEY 312), meaning that the value of only L_ORDERKEY cannot be used to point to the location a particular datum resides. Present invention embodiments enable partitioning of table 310 along multiple dimensions and pointing to a location of datum based on an individual key.

Present invention embodiments leverage multidimensional hashing to hash records within table 310 (e.g., LINEITEM) along one or more, and preferably, two or more of keys 312 (e.g., L_ORDERKEY), 314 (e.g., L_PARTKEY), and 316 (e.g., L_SUPPKEY). Each key hashes the table to a predefined number of cells within a respective dimension of a multidimensional structure 350 within shared data storage unit 130. For example, multidimensional structure 350 includes table 310 partitioned or hashed on each of keys 312, 314, 316. The data is stored within the structure based on the values of the hash function utilized for the data.

By way of example, mutlidimensional structure 350 may include three dimensions each associated with a corresponding key 312, 314, 316 and a predefined number of cells (as viewed in FIG. 3). The values produced by the hash function for each key provide a location within the structure for the corresponding row.

For example, multidimensional structure 350 may include 128 predefined cells for each dimension. Accordingly, the hash function produces one of 128 values (e.g., in a range from 0 to 127) for each key data value. When a row of table 310 (e.g., LINEITEM) is processed, the hash function is applied to individual data values from each of the key columns of the row (e.g., columns L_ORDERKEY, L_PARTKEY, and L_SUPPKEY) to produce a hash value for each key data value. By way of example, if the data value from the L_ORDERKEY column of the row produces a hash value of 34, the data value from the L_PARTKEY column of the row produces a hash value of 56, and the data value from the L_SUPPKEY column of the row produces a hash value of 73, these hash values (e.g., (34, 56, 73)) collectively designate the cell within multidimensional structure 350 to store the row (e.g., the cell at location (34, 56, 73) within multidimensional structure 350). Table 320 may be partitioned based on two or more of keys 322 (e.g., O_ORDERKEY), 324 (e.g., C_CUSTKEY), and 326 (e.g., C_NATIONKEY) in substantially the same manner described above for storage in a multidimensional structure 360 within shared data storage unit 130.

Once tables 310, 320 have been partitioned and stored within shared data storage unit 130 as described above, each processing entity (e.g., server system 110, agent or process of server system 110, etc.) performing a common join or other operation between tables 310 (e.g., LINEITEM) and 320 (e.g., ORDERS) can be assigned collocated cells of resulting mutlidimensional structures 350, 360 containing partitioned data from the tables to achieve parallel processing of the join or other operation (e.g., without data overlap with other processing entities). For example, each processing entity may be assigned corresponding portions (e.g., cells, slices, dimensions, etc. depending on the number of processing entities and based on a certain hash value or range of hash values for one or more keys) of mutlidimensional structures 350, 360 for processing. By way of example, a processing entity may be assigned a specific cell (e.g., with specific hash values for each of the keys), slice (e.g., a specific hash value or range of hash values for a specific key), or dimension (e.g., all hash values for a specific key). Since each processing entity is assigned isolated or non-overlapping data portions within mutlidimensional structures 350, 360, the operation may proceed to be processed in parallel (e.g., without overlap of data between processing entities).

The number of cells chosen for each dimension of the resulting multidimensional structure from hash partitioning of a table is typically defined in a manner where the number of cells is large compared to the number of processing entities (for parallel processing), but small compared to the total amount of data in the table. Since the number of cells chosen is typically less than the number of rows within a table, each cell contains a plurality of table rows, preferably with similar data (due to the hash function). This enables a plurality of rows from each table to be processed for each cell to enhance efficiency.

Tables of different sizes can support different degrees of multidimensional hashing of present invention embodiments. For example, when the number of cells is predefined for each structure dimension (e.g., 128 cells), the number of cells increases exponentially as the dimensionality increases. By way of example, a table with five join dimensions (or key columns) would require $128^5$ cells ($128 \times 128 \times 128 \times 128 \times 128 = 34{,}359{,}738{,}368$ cells). This may create a practical limit on the number of dimensions that can be used for hashing depending on the memory capacity of a system. However, even increasing the number of hashing dimensions from one to three creates a huge improvement allowing for expensive join operations in most systems to be collocated.

In addition, some queries may further join, by way of example, table 310 (e.g., LINEITEM) to another table, PARTSUPP (not shown), via a key, SUPPKEY, and/or include plural join operations over some overlapping subset of tables (e.g., a query that includes a join of tables 310 (e.g., LINEITEM) and PARTSUPP, and a join of tables 310 (e.g., LINEITEM) and 320 (e.g., ORDERS)). Although data for each join operation can be collocated, the results of each join are not collocated. This may be handled by directed distribution of the results of the smaller join result to the other processing entities.

Typically, the ability to collocate along two or three dimensions should resolve the most egregious collocation issues in a majority of systems, thereby reducing use of inefficient directed and broadcast join operations and providing a significant improvement in overall query performance.

Figure 4:
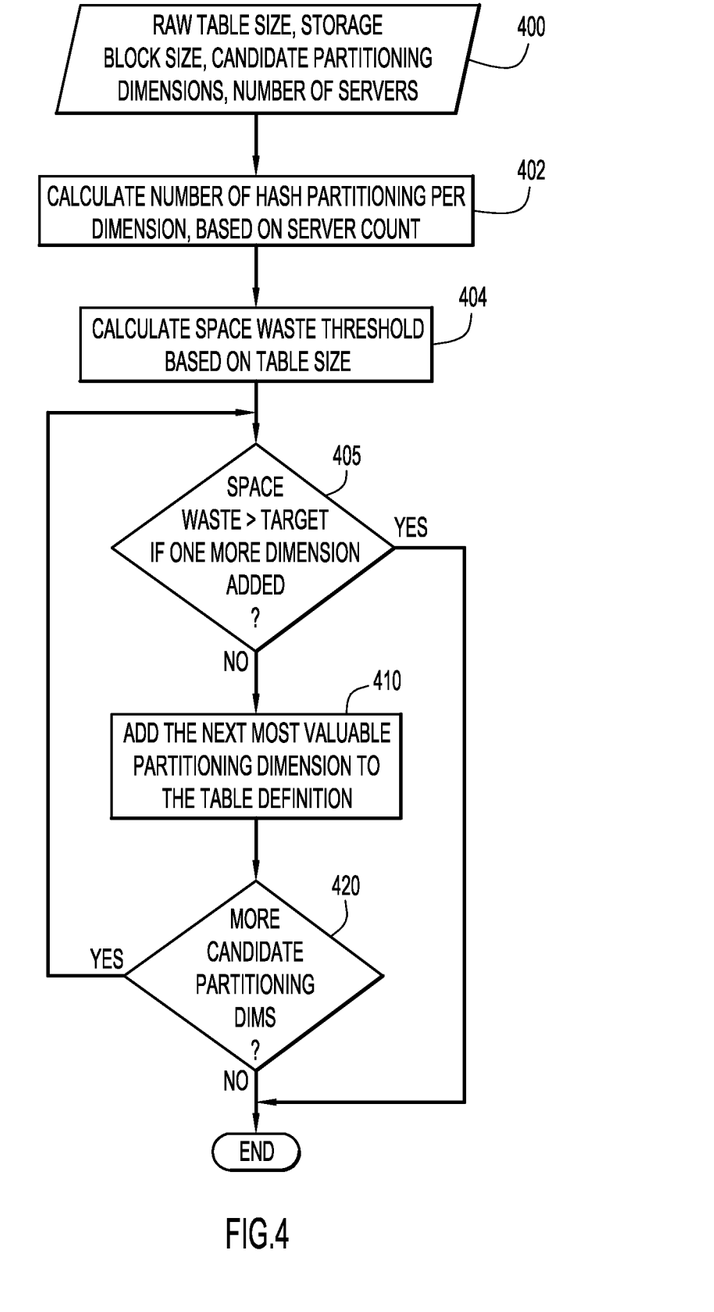
FIG. 4 is a procedural flow chart illustrating a manner of partitioning a database table for storage in a shared data storage unit according to an embodiment of the present invention.

A manner of hash partitioning a database table (e.g., via partition module 240 and server system 110) according to an embodiment of the present invention is illustrated in FIG. 4. Initially, various parameters 400 (e.g., raw table size, storage block size or disk allocation size (e.g., a unit of contiguous data on a storage disk), candidate partitioning dimensions, candidate partitioning keys, number of servers, number of cells for each dimension, etc.) are provided to perform the hash partitioning. Initially, the number of hash partitionings per dimension is calculated based on the server count at step 402, and the wasted space threshold is determined based on table size at step 404.

The system determines the feasibility of hash partitioning the database table with an additional dimension at step 405. In particular, the amount of wasted space is determined based on parameters 400 (e.g., table size, storage block size, and number of dimensions) at step 405. Initially, cells are a collection of storage blocks. If there is no data for a cell, the cell consumes no disk space, and therefore no waste. The waste comes from the assumption that there will be some data in each cell, and therefore one or more storage blocks will be allocated to hold the data in each cell. These storage blocks begin empty and as the storage blocks fill up, new blocks are added to the cell to hold additional data. Thus, cells generally have at least one storage block associated with them, and there is generally at least one partially filled block associated with each cell. Although there is a possibility that the block size and the data size match so exactly that the blocks are full, this cannot be known in advance. A safe approach is a partially filled block per cell. Since the block size is known in advance (e.g., usually chosen for I/O efficiency (e.g., in a range of 64K-1 MB and will change over time)), the space waste may be determined by number of cells*block size*0.5.

If the wasted space exceeds the target threshold as determined at step 405, the table is not a good candidate for additional dimensions and the process terminates. However, when the wasted space is less than or equal to the target threshold as determined at step 405, an additional candidate partitioning dimension may be added to the table and the next most valuable partitioning dimension is added to the table definition at step 410. The key columns of the table may be determined based on knowledge of the table joins that are, or likely to be, frequent in the workload with a focus on the joins that will be the most expensive to process (with respect to a computing resource). The above process is repeated until no more candidate partitioning dimensions can be added to the table definition as determined at step 420.

Once the hash dimensions or table definition have been determined, rows from a database table may be inserted into the multidimensional structure. For example, a row of a database table is retrieved for processing, and a hash function is applied to data within each of the key columns of that row. The hash function produces a corresponding hash value for the data from each of the key columns of the row. The hash function is preferably selected to provide a substantially even distribution of data (among dimensions and/or cells of the multidimensional structure). The resulting hash values collectively indicate a particular cell within the multidimensional structure of shared data storage unit 130 (e.g., multidimensional structures 350, 360 of FIG. 3), and the table row is stored within that cell. Each cell of the resulting multidimensional structure may include a plurality of rows depending on the particular hash function employed. This enables processing of several rows for each cell to enhance processing of database or other operations.

Figure 5:
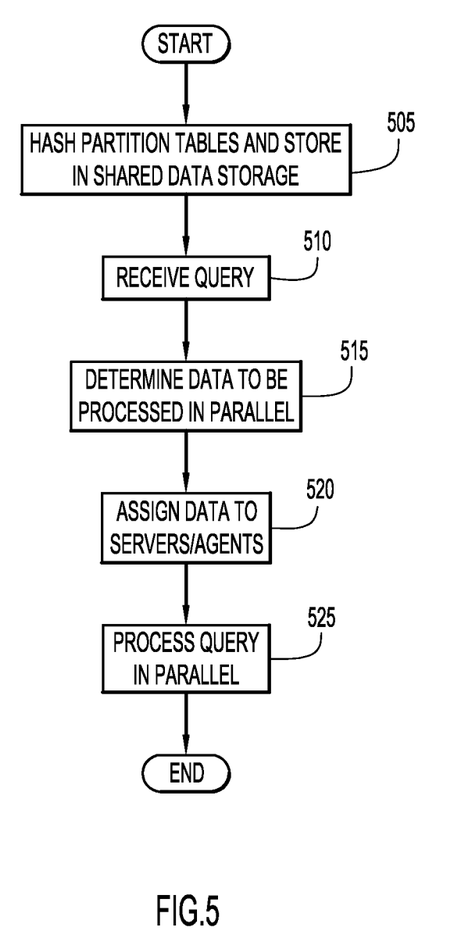
FIG. 5 is a procedural flow chart illustrating a manner of parallel processing a database or other operation according to an embodiment of the present invention.

A manner of distributing processing of a database or other operation (e.g., via parallel module 245 and server system 110) according to an embodiment of the present invention is illustrated in FIG. 5. Initially, one or more database tables are hash partitioned and stored in a multidimensional structure of shared data storage unit 130 (e.g., mutlidimensional structures 350, 360 of FIG. 3) in substantially the same manner described above. Once the tables are hash partitioned, a query is received at step 510 including a database or other operation (e.g., join, etc.).

The system determines the data to be processed in parallel based on various criteria (e.g., number of processing entities (e.g., server systems, agents or processes, etc.), data partitions, operation, hash values, knowledge of a query or operation, etc.) at step 515, and assigns tasks to the processing entities (e.g., server systems 110, agents or processes on the same or different server systems, etc.) at step 520. The tasks may include processing of any portion (e.g., cells, slices, dimensions, etc.) of the hash partitioned data within the multidimensional structures. The assignment may be dynamic and determined by a query compiler at runtime, where the decision may change from query to query.

The processing entities process the query in parallel based on the assigned tasks at step 525. This may be accomplished in various manners. For example, the processing entities may utilize a round robin approach to perform the assigned tasks and process the corresponding data portion. In this case, a pool of tasks is maintained for each server system, and each agent of the server system retrieves a next task from the corresponding pool upon completion of a current task. The server systems may each employ any number of agents to perform tasks. This approach may be similarly employed at the server system level, where a pool of tasks is maintained for the server systems. Thus, parallel processing may be employed by a plurality of server systems, and/or by a plurality of agents within one or more server systems.

Figure 6:
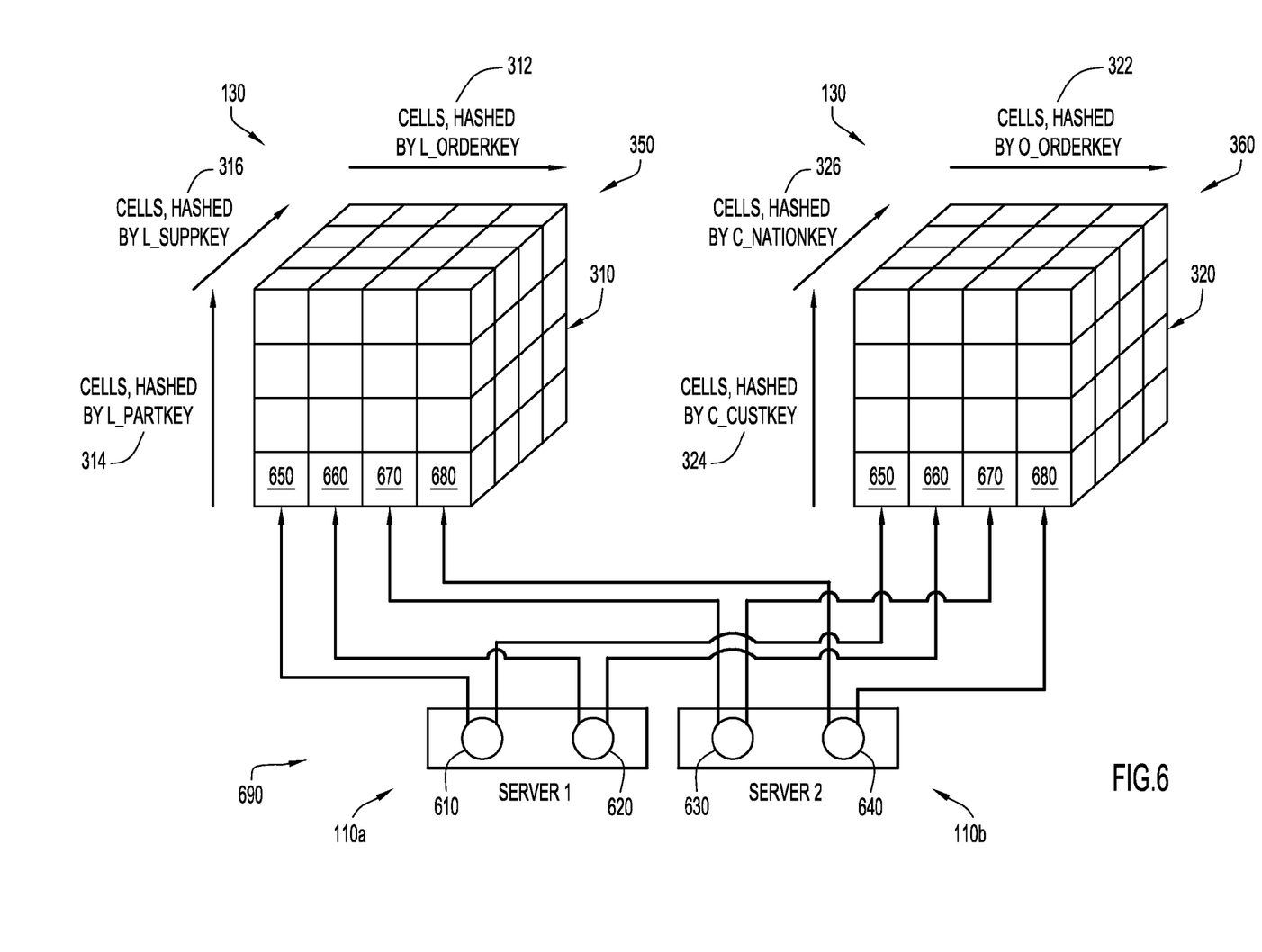
FIG. 6 is a diagrammatic illustration of server systems processing partitioned database tables in parallel according to an embodiment of the present invention.

An example of parallel processing of a database or other operation is illustrated in FIG. 6. Initially, tables 310 (e.g., LINEITEM) and 320 (e.g., ORDERS) are hash partitioned and stored in multidimensional structures 350, 360 within shared data storage unit 130. The shared data storage unit may be concurrently accessed by server systems 110a and 110b respectively including agents 610, 620 and 630, 640. Once the table data is hash partitioned, tasks may be assigned to the server systems and/or agents to be performed in parallel in order to process a database or other operation.

By way of example, server systems 110a and 110b reside within a cluster 690, and are utilized for join processing between tables 310 (e.g., LINEITEM) and 320 (e.g., ORDERS). For a specific (hash) value of key 322 (e.g., O_ORDERKEY) of table 320 (e.g., ORDERS), agent or process 610 on server system 110a can access cells 650 of multidimensional structure 360 (containing one or more table rows) for that key, and join tuples in those cells to corresponding cells 650 of multidimensional structure 350 (containing one or more table rows) for table 310 (e.g., LINEITEM) determined from the same specific (hash) value applied to key 312 (e.g., L_ORDERKEY).

Similarly, agent or process 620 of server system 110a may concurrently access cells 660 of multidimensional structure 360 (containing one or more table rows) for different (hash) values of key 322 (e.g., O_ORDERKEY), and join tuples in those cells to corresponding cells 660 of multidimensional structure 350 (containing one or more table rows) for table 310 (e.g., LINEITEM) determined from the same (hash) values applied to key 312 (e.g., L_ORDERKEY). In addition, agents or processes 630, 640 of server 110b may (in parallel with agents 610, 620 and each other) respectively access cells 670, 680 of multidimensional structure 360 (containing one or more table rows) for different (hash) values of key 322 (e.g., O_ORDERKEY), and join tuples in those cells to corresponding cells 670, 680 of multidimensional structure 350 (containing one or more table rows) for table 310 (e.g., LINEITEM) determined from the same (hash) values applied to key 312 (e.g., L_ORDERKEY).

In this manner, a join operation can be parallelized among plural processes or agents of plural servers in a cluster. Table 310 (e.g., LINEITEM) can also be joined with another table (e.g., a SUPPLIER table) using a corresponding key (e.g., L_SUPPKEY) column. Thus, a fact table (e.g., LINEITEM) can be collocated with plural dimension tables (e.g., ORDERS and/or SUPPLIER) to process a join operation in a parallel manner.

It will be appreciated that the embodiments described above and illustrated in the drawings represent only a few of the many ways of implementing embodiments for partitioning data for parallel processing.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, partition module, parallel module, etc.). These systems may include any types of monitors and input devices (e.g., keyboard, mouse, voice recognition, etc.) to enter and/or view information.

It is to be understood that the software (e.g., partition module, parallel module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., partition module, parallel module, etc.) may be available on a computer readable or useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores, or storage structures or units (e.g., files, databases, data structures, data or other repositories, indexes, materialized views, logical views, etc.) to store information (e.g., hash partitioned tables, multidimensional structures, etc.). The shared data storage unit may be implemented by any number of any conventional or other databases, data stores or storage structures (e.g., files, databases, data structures, data or other repositories, etc.) to store information (e.g., hash partitioned tables, multidimensional structures, etc.). The shared data storage unit may be included within or coupled to the server and/or client systems, may be remote from or local to the computer or other processing systems, and may store any desired data (e.g., hash partitioned tables, multidimensional structures, etc.). The shared data storage unit preferably provides concurrent access. However, the shared data storage unit may be accessed in any manner (e.g., partially or entirely concurrently, serially, etc.) and shared by any quantity of processing entities (e.g., any portion or the entirety of processing entities may have concurrent or other access to the shared data storage unit, the shared data storage unit may be unshared, etc.).

The keys for a table may be of any quantity (e.g., any quantity of columns may be designated as a key), and may be selected in any desired fashion (e.g., based on knowledge of data placement, hash functions, etc.). The hash function may include any desired function or determination for partitioning data, and may be selected in any fashion. Preferably, the hash function is selected for a substantially even distribution of data; however, any distribution of data may be utilized. Moreover, any suitable functions, determinations, or techniques may be utilized to partition the data along a plurality of keys.

The multidimensional structure may be any type of data structure (e.g., array, etc.) and include any quantity of dimensions, each with any quantity (e.g., the same or a different quantity) of cells. The multidimensional structures may be stored within any suitable storage units, preferably providing concurrent access. The partitioning may be performed in response to any suitable threshold for wasted space (e.g., zero or more storage units of wasted space, etc.). Further, the comparison to the threshold may be accomplished via any comparison or other operations (e.g., equal to, greater than, less than, greater than or equal to, less than or equal to, logic operations, etc.). The hash or function values may be utilized or arranged in any manner to indicate a storage or cell location within the multidimensional structure.

The present invention embodiments are not limited to the specific tasks or algorithms described above, but may be utilized for partitioning data of any object (e.g., table or other data or database object, etc.) for parallel processing of any database or other operations (e.g., database operations (e.g., joins, etc.), comparisons, computations, etc.). The partitions may be stored in the same or two or more different storage units. Further, the (hash or other) values for keys utilized for accessing data within the multidimensional structures are preferably the same for the different tables (in order to access corresponding data from the tables). However, the key values for the different tables may vary (e.g., preferably with some overlap) in order to retrieve corresponding data of the tables from the multidimensional structures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of partitioning data for parallel processing comprising:
  partitioning data of a data object into a plurality of data partitions within a data structure based on a plurality of keys, wherein the data object includes a database table with one or more rows and columns, and the keys include corresponding columns of the database table, wherein the data structure includes a plurality of dimensions and each key is associated with a corresponding different dimension of the data structure, and wherein partitioning data of a data object includes:
    applying a hash function to data within columns corresponding to the keys of the database table to produce hash values utilized to form the data partitions; and
    storing a row of the database table at a location within the data structure indicated by a combination of the hash values for each of the keys within that row;
  assigning portions of the data structure representing different data partitions to a plurality of processing entities; and
  processing the assigned data structure portions in parallel to perform an operation.

2. The method of claim 1, further including:
  partitioning data of a second data object, including a second database table with one or more rows and columns, into a plurality of data partitions within a second data structure based on a plurality of keys, wherein the second data structure includes a plurality of dimensions and each key is associated with a corresponding different dimension of the second data structure; and processing the assigned data structure portions includes:

processing the assigned data structure portions and corresponding portions from the second data structure in parallel to perform a join operation of the database tables.

3. The method of claim 1, further including:

storing the data structure in a data storage unit providing concurrent access to the plurality of processing entities.

4. The method of claim 1, wherein the processing entities include two or more computer systems.

5. The method of claim 1, wherein the processing entities include a plurality of agents of one or more computer systems.

* * * * *